United States Patent

Koide et al.

[11] Patent Number: 6,001,444
[45] Date of Patent: Dec. 14, 1999

[54] OPTICAL RECORDING MEDIUM

[75] Inventors: Akihiro Koide; Satoru Suda; Hideo Usui; Kenichi Arai; Yuuichi Ito; Taisaku Kano, all of Mobara, Japan; Seiji Kawamoto, Bangkok, Thailand

[73] Assignee: Mitsui Chemicals, Inc., Japan

[21] Appl. No.: 08/989,643

[22] Filed: Dec. 12, 1997

[30] Foreign Application Priority Data

Dec. 20, 1996 [JP] Japan .................................. 8-341897

[51] Int. Cl.$^6$ ...................................................... B32B 3/00
[52] U.S. Cl. ...................... 428/64.1; 428/64.4; 428/64.7; 428/64.8; 428/457; 428/913; 430/270.16; 430/495.1; 430/945; 369/283; 369/288; 106/31.62
[58] Field of Search ................................. 428/64.1, 64.2, 428/64.4, 64.7, 64.8, 65.1, 457, 913; 430/270.16, 270.2, 495.1, 945; 369/283, 288; 106/31.62, 31.9

[56] References Cited

U.S. PATENT DOCUMENTS

| | | |
|---|---|---|
| 3,957,694 | 5/1976 | Bolon et al. . |
| 4,624,891 | 11/1986 | Sato et al. . |
| 5,549,952 | 8/1996 | Arai et al. ............................... 428/64.4 |
| 5,573,831 | 11/1996 | Suzuki et al. .......................... 428/64.1 |

FOREIGN PATENT DOCUMENTS

| | | |
|---|---|---|
| 652555 | 5/1995 | European Pat. Off. . |
| 4007519 | 9/1991 | Germany . |
| 8153341 | 6/1996 | Japan . |
| 8180642 | 7/1996 | Japan . |
| WO95/28436 | 10/1995 | WIPO . |

OTHER PUBLICATIONS

Patent Abstracts of Japan, vol. 016, No. 331 (M–1282), Jul. 20, 1992 & JP 04 094982 A (Tokyo Electric Co. Ltd.), Mar. 27, 1992 *Abstract Only*.

*Primary Examiner*—Elizabeth Evans
*Attorney, Agent, or Firm*—Burns, Doane, Swecker & Mathis, L.L.P.

[57] ABSTRACT

Provided is an optical recording medium comprising at least a recording layer, a metal reflective layer, a protective layer and a printing layer laminated on a transparent substrate, wherein the printing layer is obtained by curing a UV-curing ink composition and said ink composition contains a compound which has a solubility parameter falling in the range of 7 to 10 and which takes no part in UV curing and does not react with other components contained therein.

12 Claims, No Drawings

OPTICAL RECORDING MEDIUM

BACKGROUND OF THE INVENTION

1. Field of the Invention

The present invention relates to an optical recording medium, specifically to an optical recording medium which enables writing on the surface thereof with a writing tool or a thermal transfer type printer.

2. Description of the Related Art

For read-only type optical recording media which have widely come into general use at present, such as a compact disc (hereinafter abbreviated as CD), a laser disc (hereinafter abbreviated as LD) and a digital video disc (hereinafter abbreviated as DVD), a substrate having information is produced by an injection molding method based on an original substrate usually called a stamper. This method makes it possible to produce media having the same information at a low cost in large quantities but is not suited for producing a small amount of media since the stamper is very expensive. An advance to an information-oriented society is accompanied with intensive requirements for higher density recording media than magnetic recording media. Accordingly, information recording media suited for production in small quantities or optical recording media for allowing users to freely record and preserve data have been developed.

Optical recording media can be divided into two kinds; a recordable type capable of recording and reproducing information, and an erasable type capable of erasing data after recording. Among them, a recordable type compact disc having a single substrate structure is called CD-R, and since it is compatible with an ordinary read-only CD, users thereof are gradually increasing. Since users of this CD-R write data after purchasing a medium having no data, it has to be found by any means what information is recorded on the medium.

Further, a recordable type optical recording medium called DVD-R which is compatible with a DVD has been put into the market in recent years. With respect to this, it has to be found by any means what information is recorded on the medium as is the case with a CD-R.

In general, a method of writing on a surface by hand using an oil base felt pen is employed as a method for showing a title. However, when the media are sold to end-users after inputting data into a CD-R, handwriting is not preferred. On the other hand, a method in which labels of paper and film are stuck as is the case with a floppy disc has the advantage that finely designed characters and pictures can be printed by a printer. However, when characters have to be written on the whole surface of a disc, a doughnut-shaped label having a large area has to be used, and it is very difficult to stick the label thereon while adjusting the position. Further, when a label is about to peel off, there is a fear that the label may peel off in the equipment to cause troubles. Accordingly, different methods have been desired.

SUMMARY OF THE INVENTION

With such requirements for a background, methods in which a recorded content is printed on a printing surface, which is reverse to a light-incident surface, by means of a thermal transfer type printer have been put to practice. Users can freely show information on discs using a personal computer by these methods, but they have involved the problems that thermal transfer printing can not be carried out at all depending on the condition of a printed surface, or that even if thermal transfer printing is possible, the resolution is very inferior.

Thermal transfer printing on optical recording media is described in Japanese Patent Application Laid-Open No. Hei 8-153341 and Japanese Patent Application Laid-Open No. Hei 8-180642. Japanese Patent Application Laid-Open No. Hei 8-153341 relates to an optical recording medium in which the use of phthalocyanine dyes having good heat resistance for a recording layer prevents the recording characteristics from being deteriorated by heat of a thermal head, and does not mention any contrivance for print quality in thermal transfer printing and a printing layer. Japanese Patent Application Laid-Open No. Hei 8-180642 relates to printing quality in thermal transfer printing on a label surface, wherein an image-receiving layer for melting type thermal transfer is provided on the label surface, and proposes to use an inorganic porous layer for the above image-receiving layer and further to provide a soft resin layer beneath the inorganic porous layer, thereby enhancing the printing quality.

However, when a resin having a low glass transition point such as polycarbonate is used as a substrate for optical recording media, there is a fear that the substrate may be deformed by drying at a high temperature for forming an inorganic porous layer, and there is the problem that the production process becomes complicated.

An object of the present invention is to improve such defects and provide an optical recording medium having a surface compatible with a thermal transfer type printer, on which stable and satisfactory thermal transfer printing can always be carried out to be given a sufficiently high resolution.

Intensive investigations continued by the present inventors have resulted in finding that in a printing layer obtained by curing a UV-curing ink composition comprising a main component of an ultraviolet ray-curing resin (hereinafter abbreviated as a UV-curing resin), the problems described above can be solved by allowing the above UV-curing ink composition to contain a compound which has a solubility parameter falling in the range of 7 to 10 and which takes no part in ultraviolet ray curing (hereinafter abbreviated as UV curing) and does not react with other components contained in the ink composition, preferably at least one material selected from paraffin, acrylate oligomer and fats & oils each having a solubility parameter falling in the range of 7 to 10, and thus coming to complete the present invention.

That is, the present invention relates to:

(1) an optical recording medium comprising at least a recording layer, a metal reflective layer, a protective layer and a printing layer laminated on a transparent substrate, wherein the printing layer is obtained by curing an ink composition comprising a main component of a UV-curing resin and the ink composition contains a compound which has a solubility parameter falling in the range of 7 to 10 and which takes no part in UV curing and does not react with other components contained therein, (2) the optical recording medium as described in (1), wherein the compound which has a solubility parameter falling in the range of 7 to 10 and which takes no part in UV curing and does not react with other components contained in the ink composition is at least one material selected from paraffin, acrylate oligomer and fats & oils, (3) the optical recording medium as described in (1) or (2), wherein the printing layer covers all or a part of the protective layer, (4) the optical recording medium as described in any of (1) to (3), wherein the compound which has a solubility parameter falling in the range of 7 to 10 and which takes no part in UV curing and does not react with other components contained in the ink composition is contained in the UV-curing ink composition in a proportion of 0.01 to 5% by weight, (5) the optical recording medium as described in any of (1) to (4), wherein printing is carried out on the surface of the printing layer by means of a thermal transfer type printer, and (6) a UV-curing ink composition comprising a UV-curable monomer, an oligomer, a polymerization initiator, a colorant and/or a matting filler, characterized by that it contains a compound which has a solubility parameter falling in the range of 7 to 10 and which takes no part in UV curing and does not react with other components contained therein.

The present invention is characterized by being able to obtain satisfactory resolution even in printing with a thermal transfer type printer by adding such specific compound as described above to the UV-curing ink composition used for the printing layer. Further, materials used for the recording layer shall by no means be restricted.

DESCRIPTION OF THE PREFERRED EMBODIMENTS

The solubility parameter in the present invention is a value for characterizing the solubility of resins, polymers and solvents. In general, it is abbreviated as SP and given in terms of the square root of the density of cohesive energy of the material. If the chemical structure of the material is known, the SP thereof can readily be calculated from the molecular bond constant. Further, it can experimentally be determined as well by comparing the degrees of dissolution and swelling thereof with those of a material having a known solubility parameter. It is known that when several kinds of resins and polymers are mixed, the materials having solubility parameter values which are close to each other have high compatibility and miscibility with each other.

The solubility parameter is described in detail in the thirteenth chapter of "Paint flow and pigment dispersion" (written by Temple. C. Patton, Kyoritsu Shuppan Co., Ltd.).

The optical recording medium used in the present invention is constituted by laminating a recording layer, a metal reflective layer, a protective layer and a printing layer on a transparent substrate in this order from the bottom. In order to enhance the characteristics, an undercoat layer and an intermediate layer may be provided in addition to the above layers. Further, the protective layer may be laminated in plural layers.

The substrate used in the present invention may be any material as long as it has a high transparency for reproducing and recording by means of light. Examples thereof include high molecular materials such as polycarbonate resins, acrylic resins, polystyrene resins, vinyl chloride resins, epoxy resins, polyester resins and polyolefins, and inorganic materials such as glass, but the substrate shall not be restricted to them. Among them, polycarbonate resins, acrylic resins and polyolefin resins are preferred in terms of the mechanical strength of the substrate, ease of providing grooves and read-only signals, and profitability. In particular, polycarbonate resins are preferred.

The shape of these substrates may be a plate or a film and may be a circle or a card. These substrates may have guide grooves and pits for showing recording positions and pits for information for read-only. These grooves and pits are usually formed by known methods using a stamper.

Inorganic materials such as silver alloys and tellurium alloys, organic dyes such as cyanines, phthalocyanines, azos, porphyrins and pyrromethenes, and polymers may be used for the recording layer used in the present invention. In general, organic dyes are used. These dyes may be substituted with various substituents for the sake of the solubility to solvents and the recording characteristics. These dyes can be used alone or in a mixture of several kinds thereof. Among these dyes, particularly phthalocyanine dyes have good heat resistance and durability, and when the phthalocyanine dyes are used for the recording layer, a good optical recording medium which is free from deterioration of the recording characteristics attributable to heat of a thermal head of a thermal transfer type printer can be obtained.

The recording layer containing the dye described above can be formed by coating methods such as spin coating, spray coating and dip coating.

In forming the film of the dye described above by a coating method, the dye may be dissolved in a solvent which does not damage the resin substrate, that is, a solvent which does not substantially dissolve the resin substrate, and then the solution may be applied.

In the present invention, the film thickness of the recording layer is preferably 50 to 200 nm.

In forming the recording layer containing a dye, resins such as nitrocellulose, ethyl cellulose, acrylic resins, polystyrene resins and urethane resins, leveling agents and defoaming agents as well as the dyes described above can be used in combination.

The media containing mainly an organic dye for the recording layer has been described, but the present invention can be applied as well to the media using an inorganic substance, a polymer or metal for the recording layer.

The film of metal having a high reflectance such as gold, silver, aluminum and alloys thereof is used for the reflective layer provided on the recording layer in the present invention. The reflective layer of these metals can be formed by a method such as deposition and spattering. Usually, the film thickness of these reflective layers is preferably about 50 to about 200 nm. The reflective layer can be laminated as well in a multilayer.

The protective layer is provided on the reflective layer described above. There can be used resins obtained by polymerization with a conventional radical reaction such as acrylic resins and methacrylic resins, and resins obtained by cation polymerization with light such as epoxy resins. These resins can be obtained by homopolymerization or polymerization of a mixture of monomers and oligomers. The resins diluted with solvents may be coated as well. Among the resins described above, UV-curable resins are preferably used in terms of workability. In forming the protective layer, methods such as spin coating, dip coating, bar coating and screen printing are used, and spin coating is employed in many cases because of good workability. The film thickness thereof is 1 to 100 $\mu$m, preferably 1 to 20 $\mu$m.

The protective layer may not be a single layer, and another protective layer may be laminated for the purpose of enhancing scratch resistance.

The printing layer may cover either the whole surface or a part of the protective layer provided thereunder. Printing can be carried out by known printing methods such as screen printing.

A UV-curing ink composition used for the printing layer contains a UV-curable monomer, an oligomer, a polymerization initiator, a colorant and/or a matting filler. The color of the UV-curing ink composition shall not specifically be restricted, and any colors can be used as long as they are colors usually used for UV-curing ink compositions. Matting inks may be used according to the purposes of the printing layer. The UV-curing ink composition shall not specifically be restricted as long as a UV-curing resin is contained therein as a main component, and known UV-curing ink compositions used for optical recording media can be applied.

Specific examples of the components of the UV-curing ink composition include those obtained by adding a polymerization initiator of an acetophenone group such as 1-hydroxycyclohexyl phenyl ketone, 2-hydroxy-2-methyl-1-phenylpropane-1-one and 2,2-diethoxyacetophenone and a thioxanthone group such as 2,4-diethyl thioxanthone to resins obtained by mixing acrylate monomers such as ester acrylate monomers and epoxy acrylate monomers with acrylate oligomers such as ethylene glycol acrylate oligomers and urethane acrylate oligomers and further adding a colorant such as titanium oxide and a matting filler. The solubility parameter of the UV-curing ink composition shall not specifically be restricted and is preferably about 8 to 12.

The compound which has a solubility parameter falling in the range of 7 to 10 and which takes no part in UV curing and does not react with other components contained in the ink composition is added to the UV-curing ink composition described above. In particular, the compound described above is preferably at least one material selected from paraffin, acrylate oligomer and fats & oils each of which has a solubility parameter falling in the range of 7 to 10 and each of which takes no part in UV curing and does not react with other components contained in the ink composition. More preferred is at least one material selected from paraffin, acrylate oligomer and fats & oils each of which has a solubility parameter falling in the range of 7 to 9.5 and each of which takes no part in UV curing and does not react with other components contained in the ink composition.

Satisfactory thermal transfer printing can be carried out to be given a notably elevated resolution by allowing the compound satisfying this condition to be contained in the ink composition.

The possibility that the compound comes up to the surface of the printing layer obtained by UV-curing the ink composition to change the surface condition of the printing layer is presumed as the reason therefor.

A specific example of paraffin includes liquid paraffin; specific examples of acrylate oligomer include an oligomer (monomer ratio 1:1) comprising 2-ethylhexyl acrylate and 2-ethylhexyl methacrylate-butyl methacrylate, and Resimix RL-4 (manufactured by Mitsui Chemical Co., Ltd.); and specific examples of fats & oils include coconut oil, castor oil and linseed oil.

If a compound having a solubility parameter exceeding 10 is added, the surface condition of the printed layer formed by a method such as screen printing is not suited to printing by a thermal transfer type printer, and the resolution is deteriorated.

If a compound having a solubility parameter of less than 7 is added, the UV-curing ink composition is liable to become cloudy and to cause phase separation. This is liable to bring about degradation in the stability of the ink and deterioration in the printing condition.

The compound described above is added preferably in a proportion falling in the range of 0.01 to 5% by weight, more preferably 0.02 to 3% by weight. The addition amount of less than 0.01% by weight reduces the effect of adding the compound. On the other hand, the addition amount exceeding 5% by weight lowers the viscosity and provides a disadvantage in terms of the printability.

Further, if the solubility parameter of the compound falls in the range of 7 to 10 but the compound itself reacts with other components contained in the ink, the compound is prevented from coming up to the surface of the printing layer, and the surface condition of the printing layer does not change. Specific examples of such compounds include silicone oil (methylphenyl siloxane). Many silicone oils have a solubility parameter falling in the range of 7 to 10 but cause dealcoholization with a hydroxyl group of a filler contained in the ink composition and are introduced into the ink. Accordingly, they do not contribute to a change in the surface condition of the printing layer.

The coated UV-curing ink composition is cured by irradiation with UV rays, and when curing is carried out by irradiation with UV rays, an energy of 150 to 2,000 mJ/cm$^2$, preferably 250 to 1,000 mJ/cm$^2$ is given. This irradiation cures the coated film usually at several seconds.

A mercury lamp, a high-pressure mercury lamp, an extra-high pressure mercury lamp and a metal halide lamp are preferred as a UV lamp used for curing. Thus, it becomes possible to carry out always stably satisfactory thermal transfer printing with a thermal transfer type printer by constituting the printing layer exposed on the surface in such a manner as described above.

The optical recording medium described in the present invention provides a medium capable of recording and/or reproducing information by irradiating with light and may be either a medium on which information has already been recorded or a medium which remains in a non-recorded condition to allow information to be recorded later on.

EXAMPLES

The present invention shall be specifically explained with reference to examples, but the present invention shall not be restricted to these examples.

Example 1

A recording layer comprising a phthalocyanine dye was formed on an injection-molded polycarbonate resin substrate with a thickness of 1.2 mm and a diameter of 120 mm having spiral grooves (depth: 140 nm, width: 0.5 $\mu$m and pitch: 1.6 $\mu$m) by a spin coating method using an octane solution.

An Au thin film having a thickness of 100 nm was formed as a reflective layer on the recording layer by sputtering.

Daicure Clear SD-17 (UV-curing resin manufactured by Dainippon Ink and Chemicals Inc.) was spin-coated on the reflective layer and then irradiated with UV-rays to form a protective layer of 6 $\mu$m.

One % by weight of liquid paraffin (Kishida Chemicals, Co.) having a solubility parameter of 8.6 was added to a UV-curing type white ink for CD (manufactured by Dainichiseika Color & Chemicals Mfg. Co., Ltd.) and mixed with stirring to provide the ink that was neither turbid nor separated and was in a good ink condition for printing. The ink thus prepared was applied on the protective layer described above by screen printing to form a printing layer, whereby a CD-R medium was prepared. This printing layer neither had stickiness on the surface nor caused stripes and unevenness, and the print condition was good as well.

Thermal transfer printing was carried out on the surface of the printing layer by means of a thermal transfer type printer (manufactured by Rimage Co., Ltd.) to show that the print having a very good resolution was obtained.

Example 2

A CD-R medium was prepared in the same manner as in Example 1, except that 1% by weight of an acryl oligomer (Resimix RL-4 manufactured by Mitsui Chemicals Inc.) having a solubility parameter of 8.9 was added to the UV-curing type white ink for CD.

As shown in Table 1, the ink was in a good ink condition, and the print condition was good as well.

Thermal transfer printing was carried out on the surface of the printing layer by means of the thermal transfer type printer (manufactured by Rimage Co., Ltd.) to show that the print having a very good resolution was obtained.

Example 3

A CD-R medium was prepared in the same manner as in Example 1, except that 1% by weight of a coconut oil (manufactured by Sankei Sangyo Co., Lt.) having a solubility parameter of 8 was added to the UV-curing type white ink for CD.

As shown in Table 1, the ink was in a good ink condition, and the print condition was good as well.

Thermal transfer printing was carried out on the surface of the printing layer by means of the thermal transfer type printer (manufactured by Rimage Co., Ltd.) to show that the print having a very good resolution was obtained.

Example 4

A CD-R medium was prepared in the same manner as in Example 1, except that 1% by weight of liquid paraffin (manufactured by Kishida Chemicals Co., Ltd.) having a solubility parameter of 8.6 was added to a UV-curing type mat ink for CD (manufactured by Dainichiseika Color & Chemicals Mfg. Co., Ltd.).

As shown in Table 1, the ink was in a good ink condition, and the print condition was good as well.

Thermal transfer printing was carried out on the surface of the printing layer by means of the thermal transfer type printer (manufactured by Rimage Co., Ltd.) to show that the print having a very good resolution was obtained.

Comparative Example 1

A CD-R medium was prepared in the same manner as in Example 1, except that the additive was not added to the UV-curing type white ink for CD.

As shown in Table 1, while the ink was in a good ink condition, and the print condition was good as well, the print obtained by the thermal transfer type printer had starving and was difficult to read.

Comparative Example 2

A CD-R medium was prepared in the same manner as in Example 1, except 1% by weight of butyl benzyl phthalate having a solubility parameter of 11.0 was added to the UV-curing type white ink for CD.

As shown in Table 1, while the ink was in a good ink condition, and the print condition was good as well, the print obtained by the thermal transfer type printer had a lot of starving and was difficult to read.

Comparative Example 3

A CD-R medium was prepared in the same manner as in Example 1, except 1% by weight of silicone oil (KF-54 manufactured by Shinetsu Silicone Co., Ltd.) having a solubility parameter of 8 was added to the UV-curing type white ink for CD.

As shown in Table 1, while the ink was in a good ink condition, and the print condition was good as well, the print obtained by the thermal transfer type printer had a lot of starving and was difficult to read.

Comparative Example 4

A CD-R medium was prepared in the same manner as in Example 4, except that the additive was not added to the UV-curing type mat ink for CD.

As shown in Table 1, while the ink was in a good ink condition, and the print condition was good as well, the print obtained by the thermal transfer type printer had starving which made a little difficult to read.

The inks used, the additives, the conditions of the inks and the print conditions are shown in Table 1.

TABLE 1

| | UV-curing ink | Additive | Addition amount | SP*1 | Ink condition | Print condition | Resolution in thermal transfer |
|---|---|---|---|---|---|---|---|
| Example 1 | White | Liquid paraffin | 1 wt % | 8.6 | ○ | ○ | ○ |
| Example 2 | White | Resimix RL-4 | 1 wt % | 8.9 | ○ | ○ | ○ |
| Example 3 | White | Coconut oil | 1 wt % | 8 | ○ | ○ | ○ |
| Example 4 | Mat | Liquid paraffin | 1 wt % | 8.6 | ○ | ○ | ○ |
| Comparative Example 1 | White | None | — | — | ○ | ○ | x |
| Comparative Example 2 | White | BBP*2 | 1 wt % | 11.0 | ○ | ○ | x |
| Comparative Example 3 | White | Silicone oil | 1 wt % | 8 | ○ | ○ | x |
| Comparative Example 4 | Mat | None | — | — | ○ | ○ | Δ |

*1SP: solubility parameter
*2BBP: butyl benzyl phthalate

In Table 1, the ink condition was evaluated by observing if turbidity and separation were caused after preparing and storing the ink, wherein the mark ○ was given to the good condition, and the mark x was given to the condition that turbidity and separation were caused and printing was difficult.

The print condition was evaluated by observing stripes and unevenness produced on the printing layer and stickiness present on the surface thereof, wherein the mark ○ was given to the condition that all the items described above were satisfied, and the mark × was given to the unprintable or poor condition.

In the resolution in thermal transfer, the mark ○ was given to the level that a character having a height of about ⅑ inch obtained by printing with a thermal transfer type printer could readily be read without having starving; the mark Δ was given to the level that the character had starving but could be read; and the mark × was given to the level that the character was difficult to read.

What is claimed is:

1. An optical recording medium comprising at least a recording layer, a metal reflective layer, a protective layer and a printing layer laminated on a transparent substrate, wherein the printing layer is obtained by curing an ink composition comprising a main component of UV-curing resin, and said ink composition contains a compound in an amount of 0.01 to 5% by weight which has a solubility parameter falling in the range of 7 to 9.5 and which takes no part in UV curing and does not react with other components contained in the ink composition.

2. The optical recording medium as described in claim 1, wherein the compound which has a solubility parameter falling in the range of 7 to 9.5 and which takes no part in UV curing and does not react with other components contained in the ink composition is at least one material selected from paraffin, acrylate oligomer and fats & oils.

3. The optical recording medium as described in claim 2, wherein printing is carried out on the surface of the printing layer by means of a thermal transfer printer.

4. The optical recording medium as described in claim 2, wherein an organic dye is contained in the recording layer.

5. The optical recording medium as described in claim 4, wherein a phthalocyanine dye is contained in the recording layer.

6. The optical recording medium as described in claim 2, wherein a phthalocyanine dye is contained in the recording layer.

7. The optical recording medium as described in claim 1, wherein the printing layer covers all or a part of the protective layer.

8. The optical recording medium as described in claim 1, wherein printing is carried out on the surface of the printing layer by means of a thermal transfer printer.

9. The optical recording medium as described in claim 1, wherein an organic dye is contained in the recording layer.

10. The optical recording medium as described in claim 9, wherein a phthalocyanine dye is contained in the recording layer.

11. The optical recording medium as described in claim 1, wherein a phthalocyanine dye is contained in the recording layer.

12. A UV-curing ink composition comprising a UV-curable monomer, and oligomer, a polymerization initiator, a colorant and/or a matting filler, characterized by that said UV-curing ink composition contains a compound in an amount of 0.01 to 5% by weight which has a solubility parameter falling in the range of 7 to 9.5 and which takes no part in UV curing and does not react with other components contained in the ink composition.

* * * * *